Aug. 14, 1951     R. W. PRUITT     2,564,501
OBJECT HOLDER FOR PROJECTION APPARATUS
Filed March 1, 1949     2 Sheets-Sheet 1

INVENTOR.
R. W. Pruitt
BY
ATTORNEY

Aug. 14, 1951  R. W. PRUITT  2,564,501
OBJECT HOLDER FOR PROJECTION APPARATUS
Filed March 1, 1949  2 Sheets-Sheet 2
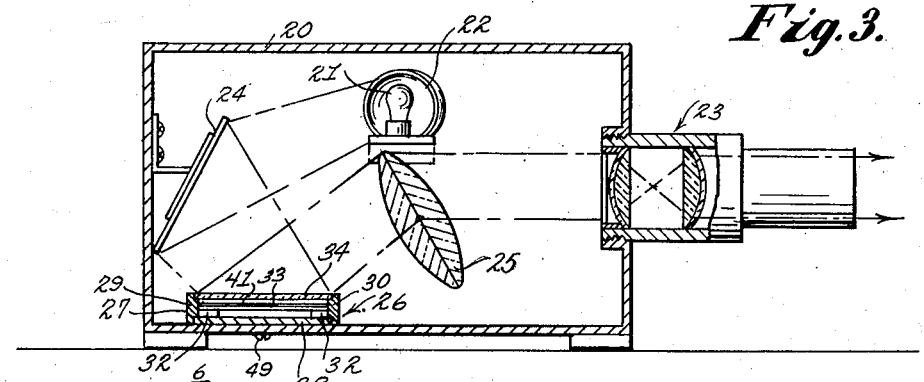
INVENTOR.
R. W. Pruitt
BY
Wilfred Lawson
ATTORNEY

UNITED STATES PATENT OFFICE 2,564,501

OBJECT HOLDER FOR PROJECTION APPARATUS

Robert W. Pruitt, Odessa, Wash.

Application March 1, 1949, Serial No. 79,019

2 Claims. (Cl. 88—26)

This invention relates to projection apparatus.

The object of the invention is to provide an object holder for opaque projection apparatus for projecting images of opaque objects.

Another object of the invention is to provide an object holder which will facilitate the projection of opaque objects and which will ensure that the objects are carefully aligned and in center.

A further object of the invention is to provide an object holder for opaque projection apparatus which is extremely simple and inexpensive to manufacture.

Other objects and advantages will be apparent during the course of the following description.

In the accompanying drawings, forming a part of this application, and in which like numerals are used to designate like parts throughout the same:

Figure 3 is a longitudinal vertical sectional view through the projector;

Figure 4 is an enlarged top plan view of the object holder, with parts thereof broken away and in section;

Figure 5 is a sectional view taken on the line 5—5 of Figure 4;

Figure 6 is a sectional view taken on the line 6—6 of Figure 4;

Figure 10 is a view of a mask mount.

Figure 1:
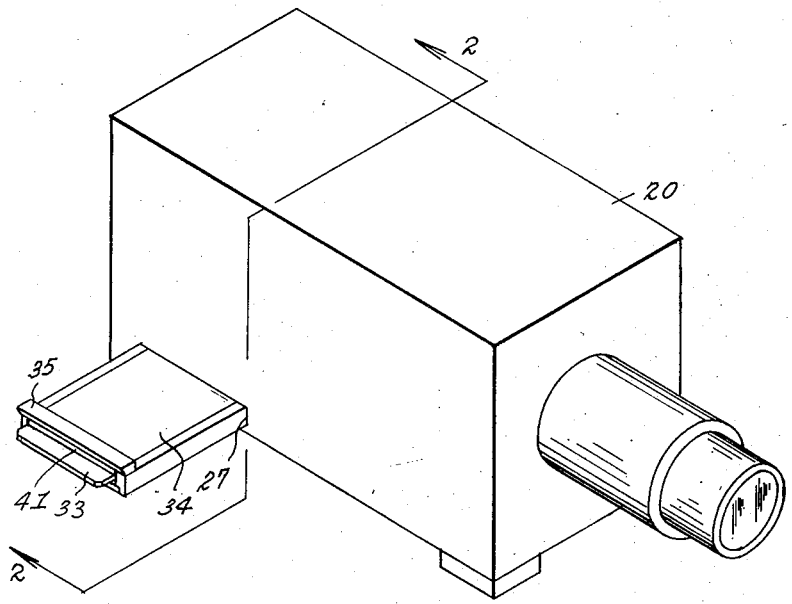
Figure 1 is a perspective view of an opaque projection machine equipped with the object holder of the present invention.
Figure 2:
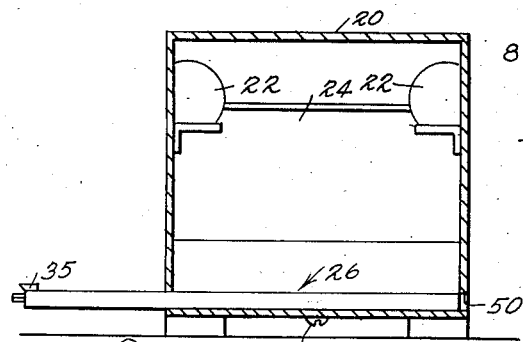
Figure 2 is a sectional view of the invention taken on the line 2—2 of Figure 1.

Referring in detail to the drawings, and more particularly to Figures 1 and 3 thereof, the numeral 20 designates the housing or casing of a conventional projection apparatus. The projection apparatus may be of any suitable construction and includes a lamp or other illuminating device 21, there being a reflector 22 supported behind lamp 21. This projection machine is of the type which is adapted for projecting images from opaque objects or slides and the machine is provided with a lens structure 23 for projecting images of opaque pictures or objects. A suitable reflector 24 may be supported in the housing 20, and suitable focusing lenses 25 are also positioned within the housing 20.

The present invention is directed to an object holder 26, although the object holder is illustrated being used for a particular type of projection apparatus, it is to be understood that the object holder can be used in any suitable type of projection apparatus. The object holder 26 may be mounted in an opening 27 in the side of the housing 20, Figure 1. The object holder 26 is fabricated of suitable material and comprises a flat base 28. A pair of spaced parallel longitudinally extending bars 29 and 30 are extended longitudinally along the base 28, there being suitable cut-outs 31 in each of the bars 29 and 30 for receiving therein the longitudinal edges of the base 28, and the base 28 is secured to the bars 29 and 30 by any suitable means.

Projecting from the base 28 and secured thereto is a plurality of rubber cushions or pads 32, and secured to the pads 32 by suitable means is a flat platform 33. The platform 33 is positioned between the bars 29 and 30 and the platform 33 is arranged adjacent to a transparent member or glass plate 34 which extends between the side bars 29 and 30 and is secured thereto as by cement or glue. One end of the platform 33 projects beyond the base 28.

Extending transversely across or between the bars 29 and 30 is a guide strip 35 which is provided with a longitudinally extending tapered side 36, Figure 5, for guiding the opaque object into position in the holder.

Figure 7:
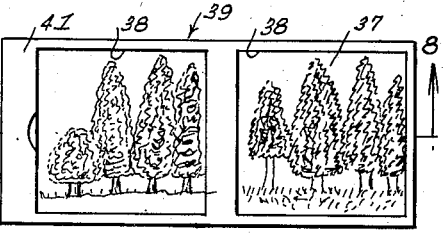
Figure 7 is a top plan view of a mask for holding opaque objects therein.
Figure 8:
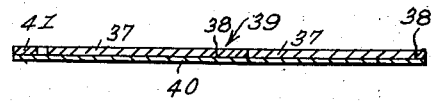
Figure 8 is a sectional view taken on the line 8—8 of Figure 7.

The opaque object or picture 37 may be positioned in a recess 38 which is formed in a mask 39, Figures 7 and 8. The mask 39 may be made of suitable material such as cardboard and comprises a backing sheet 40, to which is secured a frame 41 which may have the recesses or apertures 38 formed therein.

Figure 9:
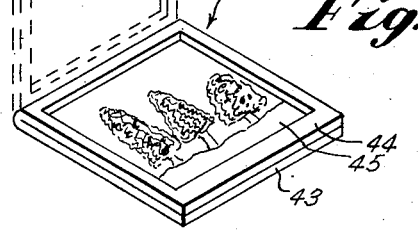
Figure 9 is a view of a modified mask.

Other types of masks may be used, such as mask 42 illustrated in Figure 9. The mask 42 may include a support member 43 and a rectangular frame member 44 is hingedly connected to the support member 43, the members 43 and 44 coacting to hold therebetween an object or picture 45 whose image is to be projected. Further, a picture 47 may be permanently secured to a mask mount 46, Figure 10, and the arrangement of Figure 10 is useful where pictures are to be used repeatedly in the opaque projection apparatus.

In use, the object holder 26 may be used with any suitable projection apparatus, and the object holder is provided with a threaded aperture 48, Figure 5, therein for receiving a threaded rivet or stud 49 whereby the object holder can be maintained immobile in the projection apparatus. Then, the user can insert opaque pictures or objects whose images are to be projected into the object holder. Thus, the pictures 37 may be arranged in the recesses 38 in the mask 39, and the mask 39 can be slid between the glass plate 34 and the platform 32, the rubber pads serving to urge the platform 33 against the mask 39 so that the mask will not shift or move in the holder. After the operator has finished projecting the images through the lens structure 23, additional masks may be inserted in the object holder whereby the mask therein may be moved out of the other end of the object holder and through the opening 50, in the opposite side of the projection apparatus 20. The holder can also be conveniently used for receiving masks such as the one shown in Figure 9, and the mask 42 is constructed so that its frame portion 44 can be pivoted away from the support member 43 in order to permit removal and replacement of slides or pictures 45 as desired. Also, the holder is adapted to receive mounts 46 which have permanently fixed thereto pictures 47, Figure 10. In certain instances, the rivet 49 may be used to provide a pivotal connection between the holder and the projector. Thus, the holder can be pivoted to a position parallel with or at right angles to the projector so that horizontal and perpendicular perspective projection can be obtained.

The object holder can be used in machines for projecting opaque objects which are widely used by educational institutions and for religious purposes. The object holder permits objects or pictures to be rapidly fed to the projection machine and insures instant centering and aligning of the objects and uniformly accurate focusing of the objects. Pictures of various lengths may be held thereon and a series or plurality of pictures may be shown with great speed and with a minimum of interruption. The mount 46 of Figure 10 is preferably formed so that its sides conform approximately to the size of the recesses 38 in the mask 39 so that the mount 46 having the picture thereon can be inserted or positioned in the recesses 38 and the entire mask 39 moved into position between the platform 32 and glass plate 44.

I claim:

1. In an object holder, a base, a pair of spaced parallel side bars extending longitudinally along said base, and secured thereto, a transparent member extending between said bars and secured thereto, a platform arranged below said transparent member for supporting an opaque object thereon, resilient means embodying a plurality of rubber pads secured to said base and to said platform for urging said platform towards said transparent member, and a guide strip extending between said bars and secured thereto for facilitating insertion of the opaque object between said platform and transparent member.

2. An object holder comprising a base, a pair of spaced parallel bars extending longitudinally along said base and secured thereto, a plurality of rubber pads secured to said base, a platform secured to said rubber pads and having one end thereof projecting beyond said base, a transparent member extending across said bars and secured thereto, a guide strip extending transversely across said bars and secured thereto, and a mask interposed between said platform and transparent member for supporting opaque objects thereon.

ROBERT W. PRUITT.

REFERENCES CITED

The following references are of record in the file of this patent:

UNITED STATES PATENTS

| Number | Name | Date |
| --- | --- | --- |
| 1,186,192 | Hoffman | June 6, 1916 |
| 1,196,924 | Bothwell | Sept. 5, 1916 |
| 1,373,491 | Detwiler et al. | Apr. 5, 1921 |
| 2,056,791 | Logan | Oct. 6, 1936 |
| 2,301,114 | Fox et al. | Nov. 3, 1942 |
| 2,335,326 | Walter | Nov. 30, 1943 |
| 2,335,697 | Reyniers | Nov. 30, 1943 |
| 2,478,638 | Ramsaur | Aug. 9, 1949 |